United States Patent Office 3,809,731
Patented May 7, 1974

3,809,731
METHOD OF FABRICATING A NUCLEAR REACTOR FUEL ELEMENT
Charles C. Woolsey, Jr., Calabasas, Calif., assignor to the United States of America as represented by the United States Atomic Energy Commission
No Drawing. Filed Mar. 31, 1961, Ser. No. 99,701
Int. Cl. G26c 21/10
U.S. Cl. 204—154.2    7 Claims My invention relates to an improved method of fabricating a uranium-zirconium hydride nuclear reactor fuel element, and more particularly to a method of protecting such a fuel element from interaction with cladding metals at elevated temperatures.

Zirconium hydride is an excellent moderating material for a nuclear reactor core, particularly where cores of small diameter or high power density are required. Hydrogen has the greatest neutron slowing down ability of any element, and combined with zirconium, a structural metal of relatively low thermal neutron absoprtion cross section, the hydrogen is in a relatively stable, high density form adapted for high temperature utilization. Zirconium hydride may be used as a moderator material in both heterogeneous and in homogeneous nuclear reactor cores. In the heterogeneous core, the fuel and moderator are separated, and in the homogeneous core, a uranium-zirconium hydride alloy composition is typically employed. The homogeneous composition has many nuclear, fabrication, and heat transfer advantages, and has been employed to date in a number of reactor systems. For information on zirconium hydride and its use in reactors, reference is made to the following representative publications: "Nucleonics," January 1960, page 104; U.S. Pat. 2,929,707; and U.S. Pat. 2,940,916 and the abandoned application S.N. 664,706 cited therein.

Present methods for the fabrication of uranium-zirconium hydride fuel elements generally involve the formation of a uranium-zirconium alloy, followed by the massive hydriding of the alloy at an elevated temperature in a hydrogen atmosphere to yield the final hydride composition. The resulting composition, when fashioned into the desired fuel element configuration, is normally encased within a protective cladding, typically of stainless steel or other high temperature alloy, to prevent release of fission products and to protect the fuel from corrosive or erosive attack by reactor working fluids.

A particular difficulty has been encountered at elevated temperatures with uranium-zirconium hydride fuel slugs encased in ferrous and nickel alloys (e.g., stainless steel and a Hastelloy). Uranium metal forms low melting eutectics with iron and with nickel (melting points just above 1300° F.) and such melting can quickly rupture thin-walled cladding tubes in reactors operating at temperatures approaching such eutectic temperatures.

Accordingly, the principal object of my invention is to provide a method of protecting a uranium-zirconium hydride fuel from interaction with its cladding.

Another object is to provide a method of preventing interaction between uranium-zirconium hydride alloy and a ferrous or nickel cladding material.

Another object is to provide a protective, unfueled coating of common properties for a uranium-zirconium alloy which can be coextruded to provide zirconium-uranium alloy rods of required dimension.

Still another object is to provide such a protected fuel member which can be hydrided massively, such that the fueled core and the cladding together maintain the moderating properties of the composition.

A further object is to provide such a fuel element which is substitutable, in terms of dimensions and nuclear characteristics, for a conventional uranium-zirconium hydride element.

Other objects and advantages of my invention will become apparent from the following detailed description.

In the present invention I have provided a method of protecting a uranium-zirconium hydride fuel from interaction with cladding material, which comprises preparing a zirconium-uranium alloy, enclosing said alloy in a sleeve of zirconium metal and then hydriding the resulting composition to yield a uranium-zirconium alloy hydride fueled core clad with a protective zirconium hydride outer region. The resulting fuel rod may then be enclosed in a conventional protective tubing, such as of stainless steel. Thus, the fuel-moderator body is surrounded by a region of unfueled zirconium hydride, providing a barrier material between the fuel-moderator material and the cladding, and preventing eutectic formation with the uranium fuel.

In this method of preventing interaction between uranium and cladding materials the moderating characteristics of the composition are retained, no problems due to differential thermal expansion of the fueled and unfueled protective regions are experienced due to the common use of zirconium hydride, possibilities of either fission product release or coolant attack on uranium due to outer tube rupture are significantly reduced, thereby providing an added safety factor, and any ratio of fueled to unfueled region thickness can be made as required for a particular application.

The range of uranium concentration in uranium-zirconium alloys which will yield readily workable alloys is very wide, typically ranging up to 50 weight percent uranium. The uranium content of the alloy will vary, as a practical matter, with the specific reactor design, and the degree of enrichment of the uranium employed. In order to make a fuel element with an unfueled zirconium hydride outer region directly exchangeable for an existing uranium-zirconium hydride element of a given size in a reactor without design modification, either the weight percent of the uranium in the alloy or the enrichment of the uranium should be increased. For example, in a 1.25 inch uranium-zirconium hydride rod having an outer unfueled zirconium hydride region of 0.15 inch, the core would contain 18.6 weight percent uranium instead of the 10 weight percent uranium of the same enrichment used for a rod fueled throughout its section. The 18.6 weight percent alloy is readily fabricated in the same manner as the 10 weight percent alloy.

The fuel-moderator member with the unfueled outer region can be fabricated using a number of fabrication methods. Therefore, the following method should be regarded as illustrative rather then restrictive of my invention. The core alloy (zirconium-uranium) is prepared by casting or arc melting. A sleeve of zirconium metal of suitable wall thickness is then slipped around the cast alloy billet. The resulting assembly is next coextruded to provide a zirconium-clad, zirconium-uranium alloy rod of required dimension. Bonding between the zirconium-uranium core and the zirconium sleeve is accomplished by coextruding at temperatures between about 800–1300° F., with a temperature of about 800–1000° F. being very satisfactory in obtaining bonding. Bonding of fuel plate assemblies or other geometric configurations may be accomplished by hot rolling or pressure bonding in the same temperature range as extrusion. The hydriding is then accomplished by heating the resulting composite rod in hydrogen. For example, the composition may be heated at temperatures of 1500–1750° F. in a hydrogen atmosphere for periods necessary to give the required degree of hydrogenation, usually until hydogen equilibium is reached. The resulting hydride rod is then provided with protective metal cladding by conventional means. For example, the hydride rod may be placed in a tight- fitting stainless steel tube and the end closures made by welding. Thermal contact between the rod and tube may be made in a number of different ways. For low power applications metallurgical bonding is not necessary and satisfactory heat transfer occurs across an air annulus between the fuel and cladding. Metallurgical bonding for higher powder application may be accomplished by hydrostatic pressing.

The following example illustrates my invention in greater detail.

An extrusion billet of a zirconium-uranium alloy is made by a double arc melting. Weighed amounts of zirconium sponge and uranium pellets to yield a zirconium alloy containing 18.6 weight percent of uranium enriched to about 90 percent in U–235 are pressed into an electrode. A 1½" diameter rod is cast from the consumable electrode; this rod is in turn used as a consumable electrode to cast a 3" diameter extrusion ingot. The latter is machined to 2.75" diameter and a zirconium tube, 2.75" ID with a 0.50" wall, slipped around the cast alloy billet. The resulting assembly is then coextruded at temperatures of 800–1000° F. to effect bonding between the fueled core and the unfueled cladding. The extrusion reduces the rod to 1.25" diameter, a reduction in area of about 9 to 1, with a 0.15" diameter unfueled outer zirconium section. The resulting rod is then hydrided in a hydrogen atmosphere at a temperature of about 1500–1750° F.

The moderator-fuel rod is then placed inside a type 347 stainless steel tube, 1.25" ID with a 0.15" wall, and end closures made by welding. The resulting fuel rod is exactly equivalent from a size and nuclear reactor performance standpoint to a similarly prepared, 1.25" diameter uranium-zirconium hydride rod, containing 10 weight percent uranium of the same enrichment homogeneously distributed throughout its section. This fuel element is useable in the reactor described in the "Nucleonics" publication referred to above.

The fuel element is then tested by placing in a furnace and heating at temperatures of about 1300° F. for a period of about 1000 hours, after which the rod is metallographically examined. There is no sign of eutectic formation between cladding and uranium, and the integrity of the rod is maintained in all other respects.

It should be understood that the above example is for purposes of illustration, and that my invention should be limited only as is indicated in the appended claims.

I claim:

1. A method of preparing a fuel-moderator core of a nuclear reactor fuel element, which comprises forming a uranium-zirconium alloy, enclosing said alloy in a zirconium metal member, bonding together said members, and then hydriding the resulting assembly to yield said fuel-moderator core.

2. The method of claim 1 wherein said zirconium-uranium alloy member and said enclosing zirconium metal member are bonded togther by coextrusion.

3. The method of claim 2 wherein said coextrusion is conducted at temperatures of 800–1300° F.

4. A method of preparing a zirconium-uranium alloy hydride fuel core enclosed in a protective enclosure of zirconium hydride, which comprises forming a zirconium-uranium alloy, enclosing said alloy in a zirconium metal member, coextruding the resulting assembly, and then hydriding the extruded assembly.

5. The method of claim 4 wherein said coextrusion is conducted at temperatures of 800–1000° F.

6. The method of claim 4 wherein said hydriding is conducted at temperatures of about 1500–1700° F. in a hydrogen atmosphere.

7. A method of preparing a zirconium-uranium hydride fuel-moderator element, which comprises forming a mixture of uranium and zirconium, forming an electrode of the resulting mixture, consumably arc melting the electrode into an extrusion billet, enclosing said billet in a zirconium sleeve, coextruding the resulting assembly at a temperature of about 800–1000° F., hydriding the coextruded member in a hydrogen atmosphere at a temperature of 1500–1750° F. to yield a fuel core of uranium-zirconium hydride alloy enclosed in zirconium hydride, and jacketing said fuel core in a protective metal enclosure selected from ferrous and nickel alloys.

References Cited

UNITED STATES PATENTS

| 2,929,707 | 3/1960 | Weeks et al. | 204—FE |
| 2,927,071 | 3/1960 | Huey | 204—FE |

FOREIGN PATENTS

| 809,280 | 2/1959 | Great Britain | 204—FE |
| 604,866 | 9/1960 | Canada | 204—FE |

OTHER REFERENCES

Nuclear Metallurgy, vol. V. 1958, published by AIME Institute of Metals Division.

Nuclear Science Abstracts, vol. 12, No. 11, Abstract No. 7254.

AEC Document BMI 1244, Dec. 1957.

REUBEN EPSTEIN, Primray Examiner

U.S. Cl. X.R.

176—70; 146—71